United States Patent [19]
Montel et al.

[11] Patent Number: 5,606,591
[45] Date of Patent: Feb. 25, 1997

[54] PROCEDURE FOR MEASURING THE DIMENSIONS OF THE OPTICAL FOCUS OF AN X-RAY TUBE

[75] Inventors: Etienne C. Montel, Vanves; Veronique H. M. P. Prejean-Lefevre, Sceaux, both of France

[73] Assignee: Societe Nationale d'Etude et de Construction de Moteurs d'Aviation, Paris, France

[21] Appl. No.: 573,259

[22] Filed: Dec. 15, 1995

[51] Int. Cl.$^6$ ............................................. G01D 18/00
[52] U.S. Cl. ............................................. 378/207; 378/91
[58] Field of Search ............................................. 378/207

[56] References Cited

U.S. PATENT DOCUMENTS

| 4,442,539 | 4/1984 | Aichinger | 378/207 |
| 4,979,199 | 12/1990 | Cueman et al. | 378/207 |

FOREIGN PATENT DOCUMENTS 0425333  5/1991  European Pat. Off. .
2485208  12/1981  France .

OTHER PUBLICATIONS

Physics in Medicine and Biology, vol. 18, No. 4, pp. 540–549, Jul. 1973, Ben A. Arnold, et al., "A Modified Pinhole Camera Method for Investigation of X-ray Tube Focal Spots".

*Primary Examiner*—Craig E. Church
*Attorney, Agent, or Firm*—Oblon, Spivak, McClelland, Maier & Neustadt, P.C.

[57] ABSTRACT

A method of measuring the dimensions of the optical focus of an X-ray tube is described which consists of producing an X-ray image of the optical focus on a fine-grained X-ray-sensitive film, illuminating the radiogram obtained by means of a lamp emitting homogeneous radiation and taking a video image of the radiogram by means of a video camera, processing the video image so as to obtain a digitized image of the optical focus, and measuring the dimensions of the optical focus from the digitized image obtained.

5 Claims, 2 Drawing Sheets

PROCEDURE FOR MEASURING THE DIMENSIONS OF THE OPTICAL FOCUS OF AN X-RAY TUBE

BACKGROUND OF THE INVENTION

1. Field of the Invention

The invention relates to a method of measuring the dimensions of the optical focus of an X-ray tube from a radiogram obtained by means of a pinhole camera, and is applicable especially to the radiographic inspection of components.

It is common practice to use radiographic inspection to detect internal defects in a component. These defects may arise from a lack of material or the presence of materials of different densities. In the case of an X-ray photograph or radiogram, the regions lacking in material form darker areas in the radiogram, due to lower absorption of the radiation, and the presence of denser or less dense materials gives, respectively, lighter or darker areas in the radiogram, due to different absorption of the radiation. However, this method does not enable defects below a certain minimum size to be detected, this minimum size depending on the sensitivity of the detector, on the power of the X-ray tube, and on the dimensions of the optical focus of the X-ray tube. In order to detect defects in a component and to measure their dimensions, it is therefore necessary to know the characteristics of the X-ray tube, and in particular to know the dimensions of the optical focus of this tube.

Moreover, since the size of the optical focus and the homogeneity of the emitted beam may vary over time, it is necessary to be able to monitor the dimensions of this focus and to monitor the homogeneity of the emitted beam in the case of doubt if the quality of the images obtained has become degraded, and even to carry out these monitoring operations periodically in order to ensure that there is no drift.

2. Summary of the Prior Art

In order to measure the dimensions of the-optical focus of an X-ray tube, it is known to use a pinhole camera placed in the path of the rays coming from the anode of an X-ray tube to produce an X-ray image of the optical focus on a fine-grained X-ray-sensitive film. By suitably choosing the distances between the pinhole and the plane of the film and between the focus of the tube and the pinhole, an enlarged image of the focus is obtained on the film. The image thus obtained may be examined, in a known manner, by eye through a graduated magnifying glass or by using a microdensitometer.

When examining the image by eye, the dimensions of the focus are measured from the perceptible edges of the image and by taking into account the magnification factor. However, since this method is subjective, it is not reliable and leads to results differing from one operator to another.

When examining the image by means of a microdensitometer, the measurement is carried out automatically. The microdensitometer calibrates, makes a section along a single line of the image and measures the length of the optical focus on the basis of this section. This method is very accurate as long as the microdensitometer is positioned correctly so that the section is made at the place where the spot physically representing the optical focus is widest. However, since the section thus made enables only a single image line to be seen at a time, this method does not make it possible to know the energy distribution nor to check the homogeneity of the emitted beam. The energy distribution can be obtained only by carrying out a complete scan of the radiogram, which takes up a lot of time and is very expensive.

SUMMARY OF THE INVENTION

It is an object of the invention, therefore, to provide a method of measuring the dimensions of the optical focus of an X-ray tube which is reliable and rapid, which does not require specific and expensive apparatus, and which makes it possible to obtain a simple representation of the distribution of the energy emitted by the X-ray tube.

For this purpose, the method essentially involves producing an X-ray image of the optical focus on a fine-grained X-ray-sensitive film, illuminating the radiogram obtained by means of a lamp which emits homogeneous radiation at an intensity which is substantially constant over time, taking a video image of the radiogram by means of a video camera, processing the video image so as to obtain a digitized image of the optical focus, and measuring the dimensions of the optical focus from the digitized image obtained.

More specifically, the invention provides a method of measuring the dimensions of the optical focus of an X-ray tube, comprising the steps of:

(a) taking a first video image of a standard radiogram having regions of progressive and known different densities;

(b) producing a dimensional calibration curve for said first video image and also a density calibration curve;

(c) producing a radiogram representing an X-ray image of the optical focus of said X-ray tube;

(d) taking a second video image of said radiogram representing the X-ray image of said optical focus;

(e) determining the density of the base fog in said radiogram representing the X-ray image of said optical focus;

(f) calculating a threshold density and using said density calibration curve to determine the corresponding grey level in said second video image of said radiogram representing the X-ray image of said optical focus.

(g) digitizing said second video image at a threshold value equal to said grey level determined in step (f); and (h) measuring the dimensions of said optical focus of said X-ray tube from said digitized second video image by using said dimensional calibration curve.

The features and advantages of the invention will now be described in more detail by reference to a non-limiting embodiment, given byway of example, and with reference to the attached drawings.

DESCRIPTION OF THE PREFERRED EMBODIMENTS

Figure 1:
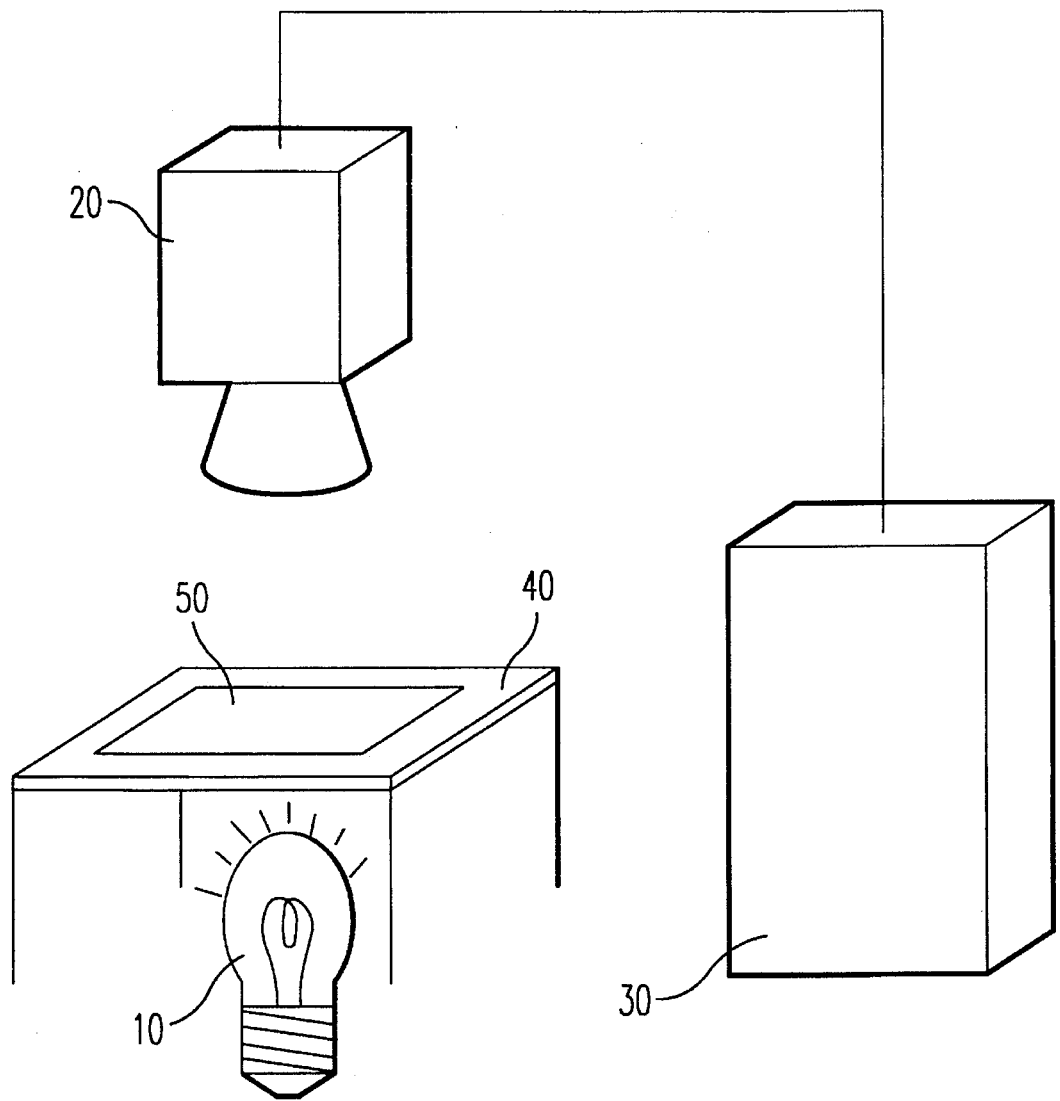
FIG. 1 is a diagram showing the principles of a measurement device for carrying out the method according to the invention; and, FIG. 2 is a block diagram of the steps followed in carrying out the measurement method in accordance with the invention.

The measurement device shown in FIG. 1 comprises a light source 10 for emitting homogeneous radiation, for example a lamp emitting white light, a video camera 20 fitted with an objective, an image-processing device 30, and a radiogram support 40. The radiogram 50 to be analysed is placed on the radiogram support between the lamp 10 and the video camera 30.

Figure 2:
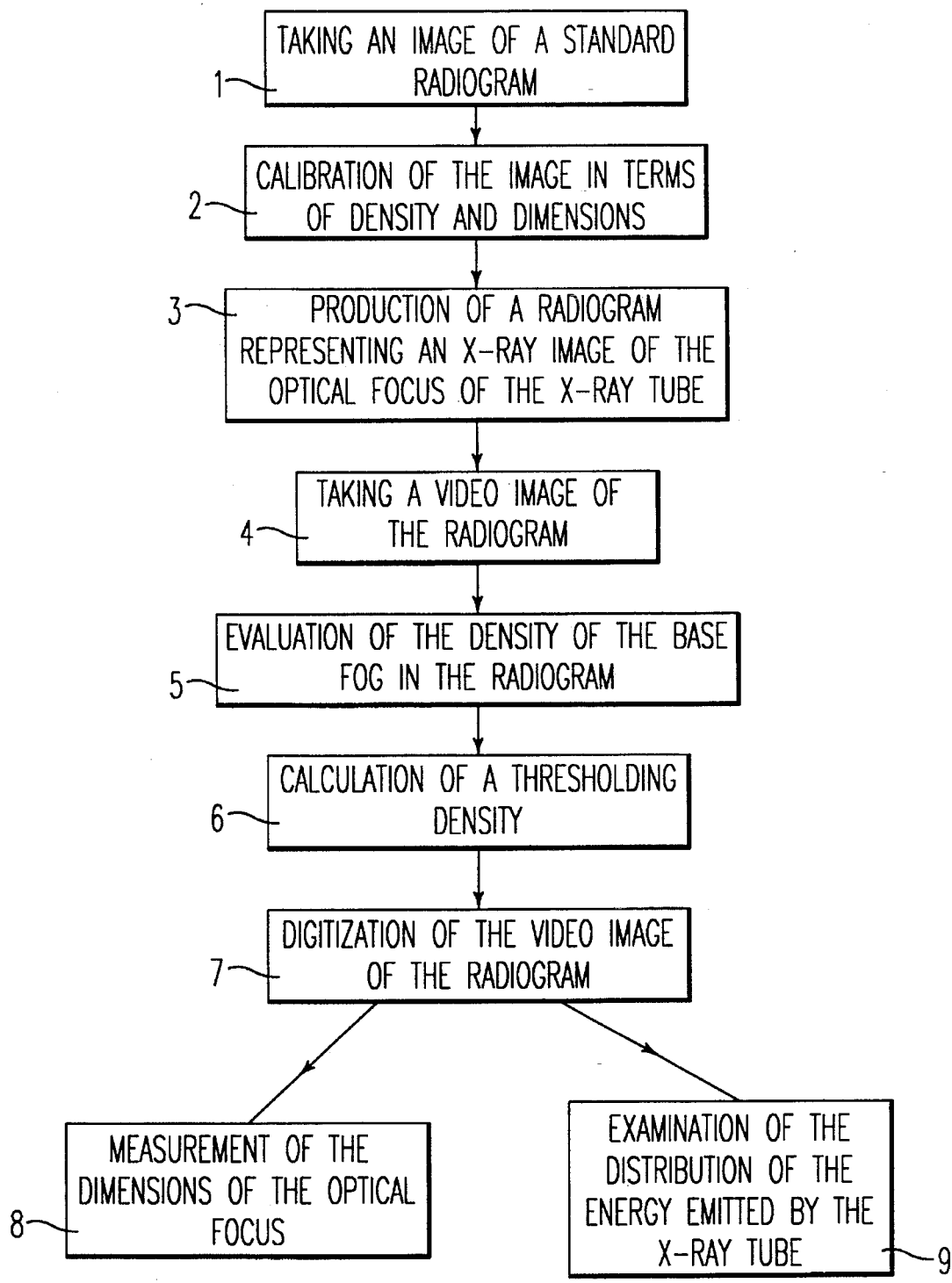

FIG. 2 shows a block diagram of the steps followed in carrying out the measurement method of the invention.

The method comprises a first step 1 in which a video image of a standard radiogram is taken, the standard radiogram being a radiogram having regions of different and progressive known densities lying at the very least between 0.2 and 2.5. This standard radiogram may be produced, for example, by using a stepped metal shim having regions of different thicknesses and by producing an X-ray image of this stepped shim on a fine-grained X-ray-sensitive film. It is also possible to produce several standard radiograms by using, for each radiogram, a sheet of a given thickness which is different from the thicknesses of the other sheets. The various radiograms representing the X-ray images of the various sheets are produced on identical fine-grained films. The standard radiogram is placed on the radiogram support 40 and an image of this radiogram is taken by the video camera 20.

In a second step 2, a density calibration curve and a dimensional calibration curve are produced from the image of the standard radiogram. The density calibration curve is produced by assigning, to each density in the standard radiogram, the corresponding grey level obtained from the image of the radiogram. The dimensional calibration curve is produced by means of a graticule which is graduated, for example, with 0.1 mm divisions for the horizontal and vertical axes of the image. This calibration curve enables the dimensions of a pixel of the image to be determined.

In a third step 3, an X-ray image of the optical focus of an X-ray tube is produced on a fine-grained X-ray-sensitive film identical to that used for producing the standard radiogram. The radiogram of the optical focus is produced conventionally by means of a pinhole camera located at a distance a from the anode constituting the optical focus of the X-ray tube, the film being located at a distance b from the pinhole. The ratio of the distance b between the pinhole and the film to the distance a between the focus and the pinhole represents the magnification factor of the image of the focus produced on the film.

In a fourth step 4, the standard radiogram is removed from the radiogram support 40 and replaced by the radiogram bearing the X-ray image of the optical focus of the X-ray tube. A video image of this radiogram is then taken by the video camera 20.

In a fifth step 5, the density of the base fog, denoted by $D_F$, in the radiogram bearing the X-ray image of the optical focus of the X-ray tube is determined. The density of the base fog in the radiogram is the density of that part of the radiogram not exposed to the X-rays. This determination may be obtained as a direct reading by means of a calibrated densitometer, or from the grey level corresponding to this base fog in the video image of the radiogram using the density calibration curve.

In a sixth step 6, a thresholding density, denoted by $D_T$, is calculated, preferably in accordance with the information given in the NFC74-100 standard:

$$D_T = 1.1\, D_F$$

This thresholding density corresponds to a contrast level of 5% in the image. The correspondence of this grey-level thresholding density is then determined from the density calibration curve and used in a seventh step 7 to digitize the video image of the radiogram.

The dimensions of the optical focus of the X-ray tube are then determined in an eighth step 8 from the digitized video image and by using the dimensional calibration curve. The dimensions which are typically measured are the height and width of the focus. The values taken are the maximum values measured on the digitized grey-level image.

The digitized grey-level image also makes it possible, in a ninth step 9, to examine the distribution of the energy emitted by the X-ray tube, this energy distribution being represented by the variations in grey level which are contained within the image. This examination makes it possible to explain possible inhomogeneity problems in the image formed.

The video images are preferably taken with a magnification factor such that the optical focus occupies a large part of the image, this magnification factor being constant for every video image taken during steps 1 and 4.

Moreover, it is preferable for the video camera to be adjusted so that the gain level and the black level are constant for every video image taken.

We claim:

1. A method of measuring the dimensions of the optical focus of an X-ray tube, comprising the steps of:

(a) taking a first video image of a standard radiogram having regions of progressive and known different densities;

(b) producing a dimensional calibration curve for said first video image and also a density calibration curve;

(c) producing a radiogram representing an X-ray image of the optical focus of said X-ray tube;

(d) taking a second video image of said radiogram representing the X-ray image of said optical focus;

(e) determining the density of the base fog in said radiogram representing the X-ray image of said optical focus;

(f) calculating a threshold density and using said density calibration curve to determine the corresponding grey level in said second video image of said radiogram representing the X-ray image of said optical focus;

(g) digitizing said second video image at a threshold value equal to said grey level determined in step (f); and (h) measuring the dimensions of said optical focus of said X-ray tube from said digitized second video image by using said dimensional calibration curve.

2. A method according to claim 1, inching the further step of examining the distribution of the energy emitted by said X-ray tube using said digitized second video image.

3. A method according to claim 1, wherein said radiogram representing said X-ray image of said optical focus is produced step (c) by using a pinhole camera placed in the path of the X-ray beam emitted by said X-ray tube.

4. A method according to claim 1, wherein said density of the base fog is determined in step (e) by direct reading from said radiogram using a calibrated densitometer.

5. A method according to claim 1, wherein said density of the base fog is determined in step (e) from the grey level corresponding to said base fog in said second video image by using said density calibration curve.

* * * * *

UNITED STATES PATENT AND TRADEMARK OFFICE
CERTIFICATE OF CORRECTION

PATENT NO. : 5,606,591
DATED : FEBRUARY 25, 1997
INVENTOR(S) : MONTEL ET AL

It is certified that error appears in the above-identified patent and that said Letters Patent is hereby corrected as shown below:

Column 1, line 39, delete "-".

Column 4, line 51, change "inching" to --including--.

Signed and Sealed this

Second Day of December, 1997

Attest:

Attesting Officer

BRUCE LEHMAN
Commissioner of Patents and Trademarks